(12) United States Patent
Krummell

(10) Patent No.: US 8,727,144 B2
(45) Date of Patent: May 20, 2014

(54) RAIL ATTACHMENT FOR A DRIVE-IN STORAGE RACK

(75) Inventor: John V. R. Krummell, Long Beach, CA (US)

(73) Assignee: J.C.M. Industries, Inc., Garden Grove, CA (US)

( * ) Notice: Subject to any disclaimer, the term of this patent is extended or adjusted under 35 U.S.C. 154(b) by 0 days.

(21) Appl. No.: 12/968,112

(22) Filed: Dec. 14, 2010

(65) Prior Publication Data

US 2012/0145657 A1 Jun. 14, 2012

(51) Int. Cl.
*A47B 43/00* (2006.01)

(52) U.S. Cl.
USPC ........................................................ 211/191

(58) Field of Classification Search
USPC ................... 211/189, 190, 191, 192, 151, 26;
248/200, 300, 235, 295.11;
312/265.1–265.4, 223.1
See application file for complete search history.

(56) References Cited

U.S. PATENT DOCUMENTS

| | | | | |
|---|---|---|---|---|
| 5,180,068 A | * | 1/1993 | Vargo | 211/191 |
| 5,542,549 A | * | 8/1996 | Siemon et al. | 211/26 |
| 5,566,836 A | * | 10/1996 | Lerman | 211/26 |
| 5,769,249 A | * | 6/1998 | Lascara | 211/191 |
| 6,070,957 A | * | 6/2000 | Zachrai | 312/334.4 |
| 6,230,903 B1 | * | 5/2001 | Abbott | 211/26 |
| 6,378,711 B1 | * | 4/2002 | Skulnik et al. | 211/183 |
| 6,378,966 B1 | * | 4/2002 | Baker et al. | 312/333 |
| 6,702,124 B2 | * | 3/2004 | Lauchner et al. | 211/26 |
| 6,776,298 B2 | * | 8/2004 | Courtwright | 211/191 |
| 7,218,526 B2 | * | 5/2007 | Mayer | 361/725 |
| 2002/0117462 A1 | * | 8/2002 | Hung | 211/189 |
| 2003/0106863 A1 | * | 6/2003 | Lauchner et al. | 211/26 |
| 2004/0084394 A1 | * | 5/2004 | Powell | 211/192 |
| 2006/0157436 A1 | * | 7/2006 | Iwamoto | 211/191 |
| 2006/0260044 A1 | * | 11/2006 | Nebel | 5/118 |
| 2009/0101603 A1 | * | 4/2009 | Hilburn et al. | 211/26 |
| 2010/0006518 A1 | * | 1/2010 | Brobst | 211/26 |

* cited by examiner

*Primary Examiner* — Darnell Jayne
*Assistant Examiner* — Hiwot Tefera
(74) *Attorney, Agent, or Firm* — Kenneth H. Ohriner; Perkins Coie LLP

(57) ABSTRACT

A drive-in rail attachment or arm attaches left and right side drive-in rails to left and right side uprights in a drive-in storage rack. The left and right side rail arms may each be formed from a flat plate having an upright section, a sidewall section and a rail section. The upright section may be bent about a first axis to an orientation substantially perpendicular to the sidewall section and the rail section bent about a second axis to an orientation substantially perpendicular to the sidewall section. First and second pairs of holes may be provided in the upright section, with the first pair of holes optionally offset from the second pair of holes. Drive-in rails can be attached to the storage rack without the need for welded components.

5 Claims, 8 Drawing Sheets

RAIL ATTACHMENT FOR A DRIVE-IN STORAGE RACK

BACKGROUND

The field of the invention is storage racks. Storage racks are typically used in warehouses and other storage facilities to efficiently store loaded pallets. A drive-in rack has an open space between drive-in or side rails large enough to allow a fork-lift truck to enter. This allows the fork lift truck to place pallets directly on rails, at pallet storage positions set back from the front of the storage rack.

In constructing a drive-in storage rack, the drive-in rails must be securely attached to the uprights of the storage rack. In the past, this attachment has been made using a bracket 28 or 40, as shown in FIGS. 1-3. The bracket 28 has an upright angle section 30 welded to an arm section 32 as shown in FIG. 1. A bolt clip 34 is welded to a back or outer surface of the drive-in rail 16, as shown in FIGS. 2 and 3. Bolts 36 attach the arm section 32 to the bolt clip 34, and also attach the upright angle section 30 to the uprights 14. FIG. 3 shows another bracket 40 similar to the bracket 28 shown in FIGS. 1 and 2, but using a flat plate 42 bolted to the upright 14 instead of the upright angle section 30 shown in FIGS. 1 and 2. While these designs have worked well in the past, they have certain drawbacks.

Initially, these designs require welding the arm section 32 to the upright angle or plate section 30 or 42, and also welding the bolt clip 34 to the drive-in rail 16. These welding steps require time and expense in manufacturing the components for the drive-in rails. During the manufacturing process, dimensional tolerances must also be held to within specified ranges as well, to insure that the bolt holes will line up, further adding to the time and expense for manufacturing, and increasing the potential for scraping components.

In addition, to facilitate installation of drive-in rack components, attachment holes in the upright, bracket and clip components must be oversized to allow fasteners, e.g., bolts, to be installed. Due to the clearance in the bolted connections, when a load is applied to the drive-in rail, the bracket, arm and clip assembly can deflect or sag. This can cause the drive-in rail to deflect into an out of level position, where the rail may not support pallets properly. Accordingly, an improved drive-in rail attachment is needed.

SUMMARY OF THE INVENTION

A new drive-in rail attachment or bracket has now been invented that largely overcomes the disadvantages of earlier designs. This new drive-in rail attachment attaches left and right side drive-in rails to left and right side uprights in a drive-in storage rack. The left and right side brackets may each be formed from a flat plate having an upright section and a rail section. The upright section may be bent about a first axis to an orientation substantially perpendicular to the rail section. First and second through holes may be provided in the upright section, with the first hole offset from the second hole. Compared to existing designs, this new design may allow for use of thinner material, avoiding welding, reducing the number of separate pieces required, and reduces costs. The new brackets also provide better support for pallets placed in the storage rack. Other and further objects and advantages will appear in the following detailed description which discloses several embodiments of the invention.

BRIEF DESCRIPTION OF THE DRAWINGS

In the drawings, the same reference number indicates the same element in each of the views.

DETAILED DESCRIPTION OF THE DRAWINGS

Figure 1:
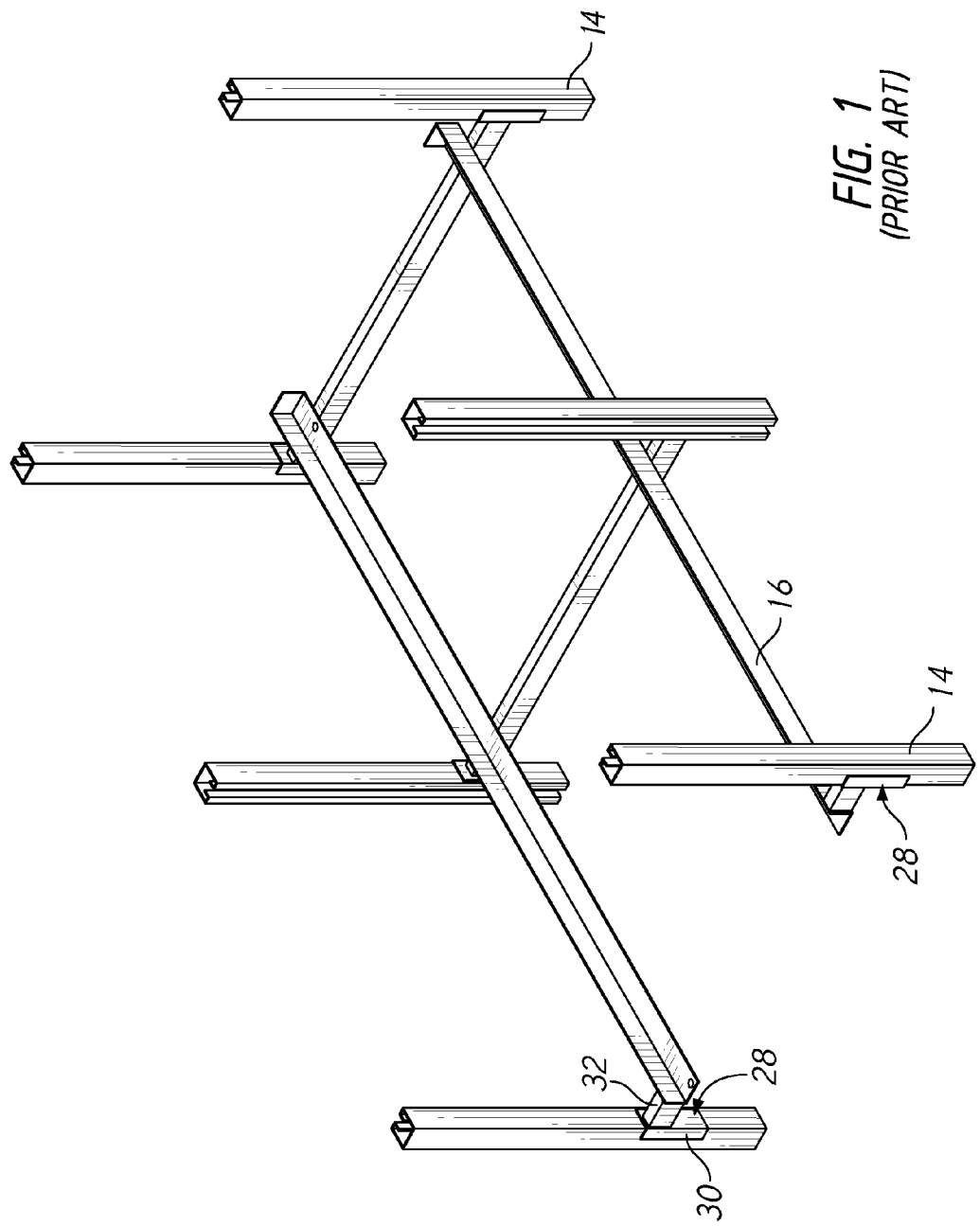
FIG. 1 is a perspective view of a prior art drive-in storage rack.
Figure 2:
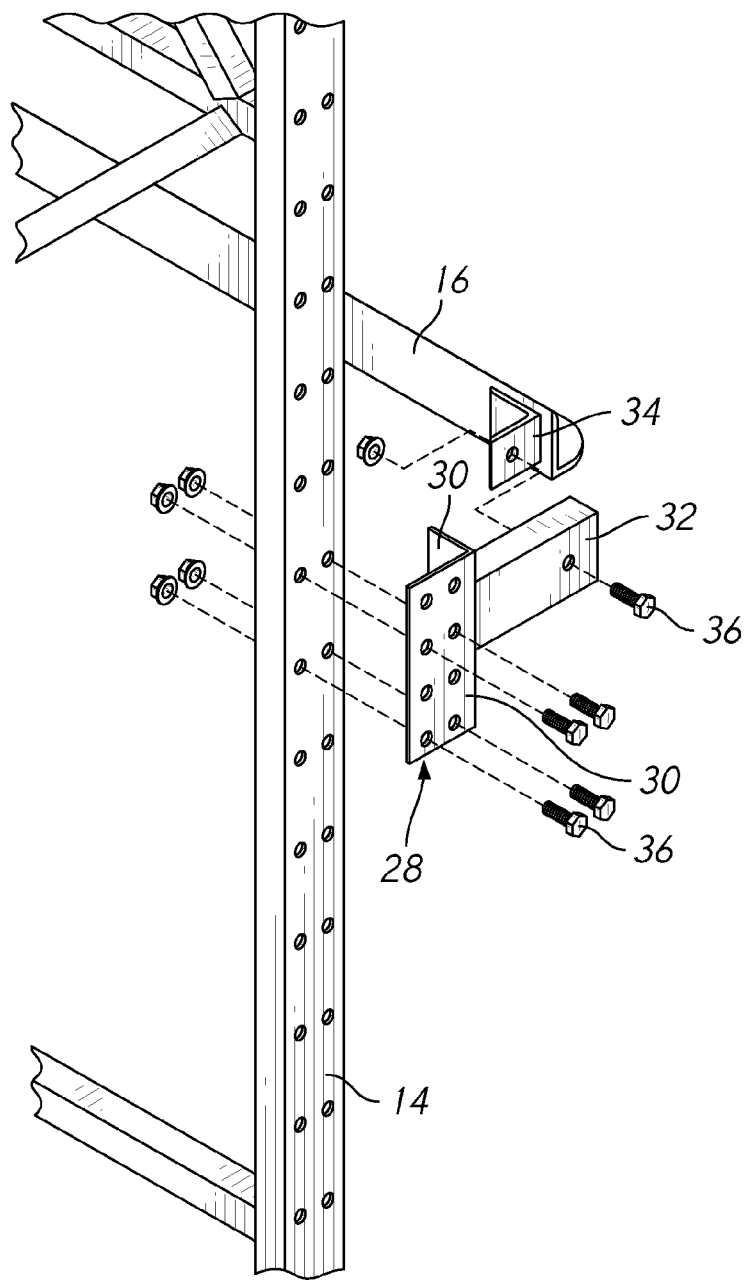
FIG. 2 is an enlarged partial perspective view of a prior art drive-in rail attachment.
Figure 3:
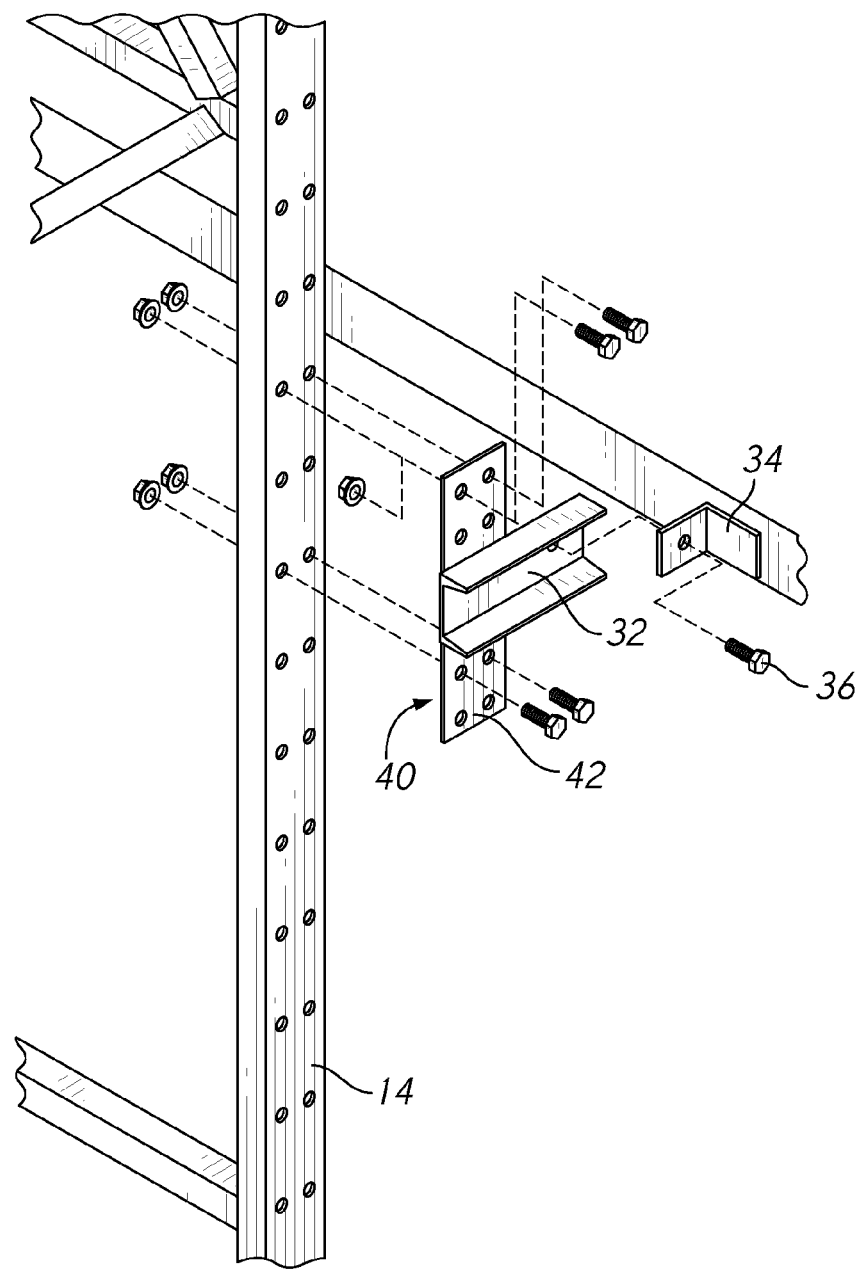
FIG. 3 is an enlarged partial perspective view of an alternative prior art drive-in rail attachment.

Turning now in detail to the drawings, FIGS. 1-3 show prior art designs as discussed above. The storage rack shown in the drawings may be any type of storage rack, having a drive-in aisle.

Figure 5:
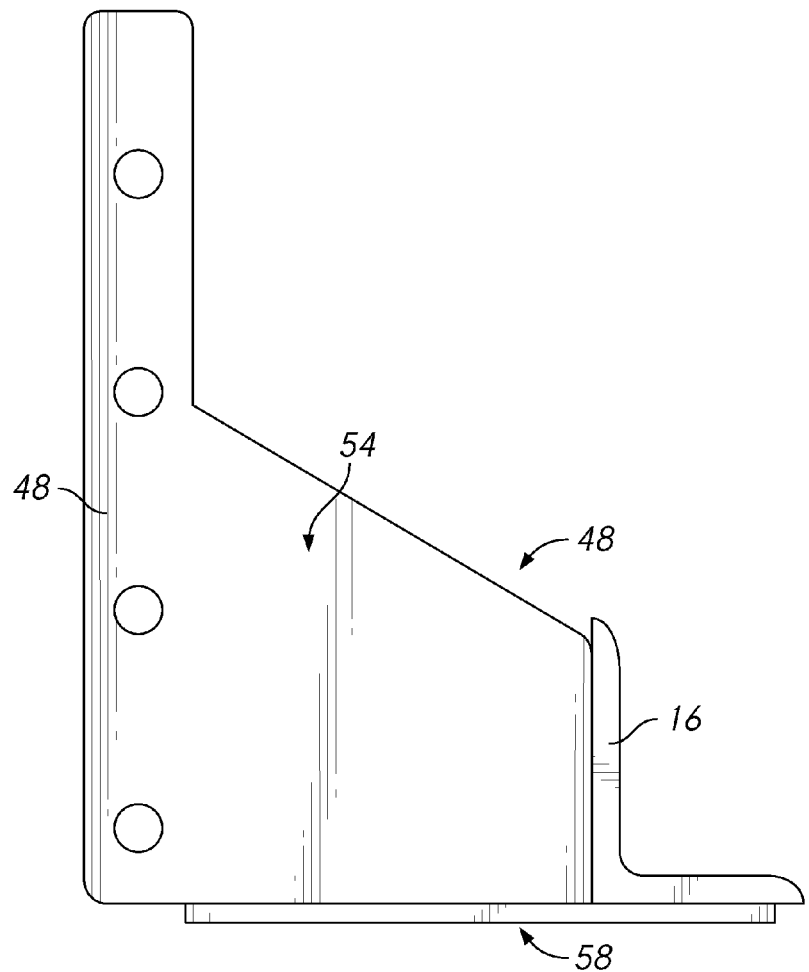
FIG. 5 is a front view of alternative bracket design.

FIG. 5 shows a front view of a new bracket 48 which may be formed from a flat plate of material, such as steel. The flat plate may be cut out from stock steel plate, typically via automated cutting equipment. The bracket 48 may be described as having an upright section 54 bent along a bend line 62 to a right angle relative to a rail section 58. The bending along the line 62 may be made using standard fabrication equipment.

Figure 4:
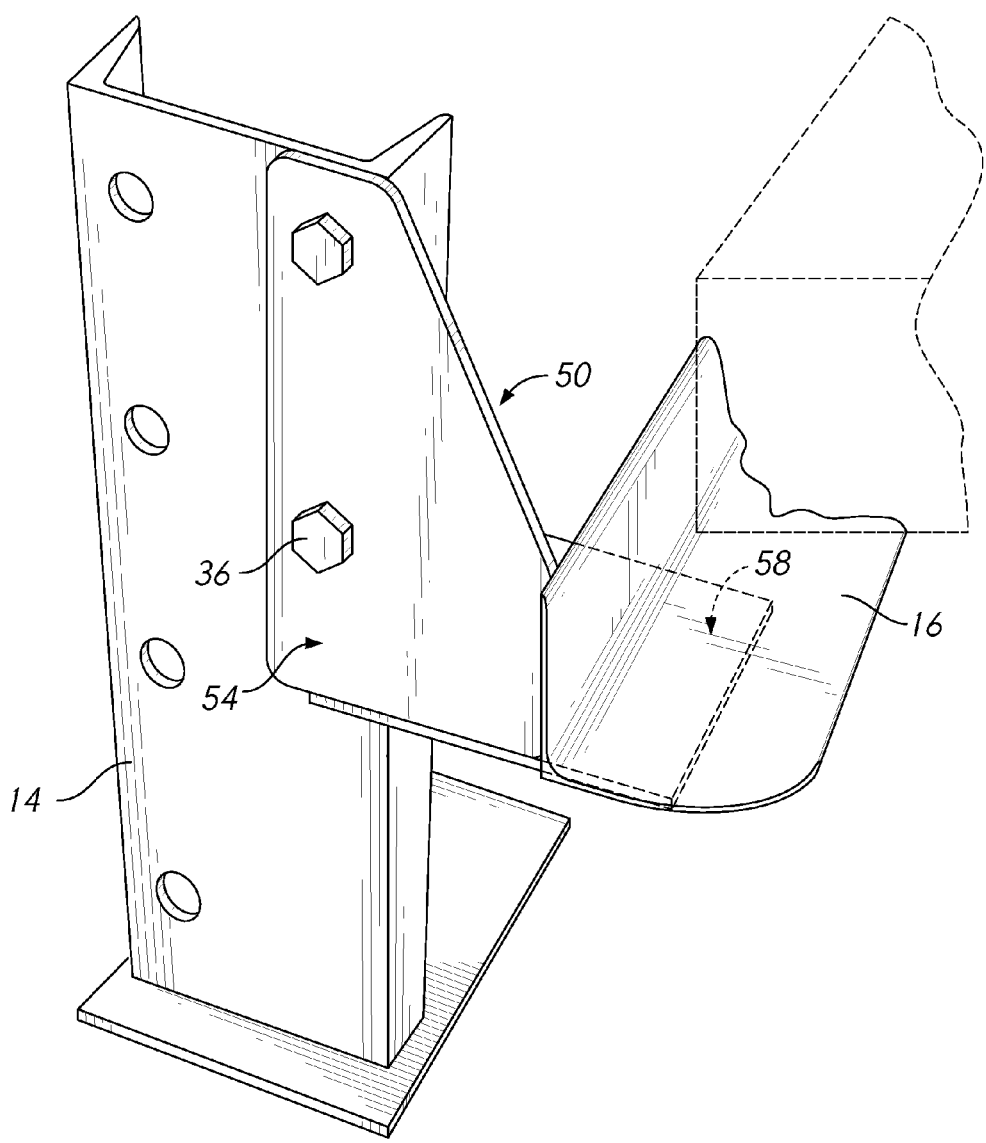
FIG. 4 is a perspective view of a new bracket for attaching a drive-in rail to an upright in a drive-in storage rack.

Through holes 64 may be punched, drilled or cut in the upright section 54 in a pattern generally matching the hole pattern in the uprights 14 shown in FIGS. 1-3. FIG. 4 shows a perspective view of a similar bracket 50 having a shorter upright section 54 having two holes instead of four holes. The upright section 54 of the bracket 50 is bolted onto an upright 14 of the storage rack, and the drive-in rail 16 is supported on the rail section 58 of the rail arm 50. The bracket 50 accordingly provides an attachment for connecting the drive-in rail 16 to the rack, without the need for the multiple piece weldments used in the prior art. The bracket 50 hence provides a more efficient and cost effective design.

Figure 6:
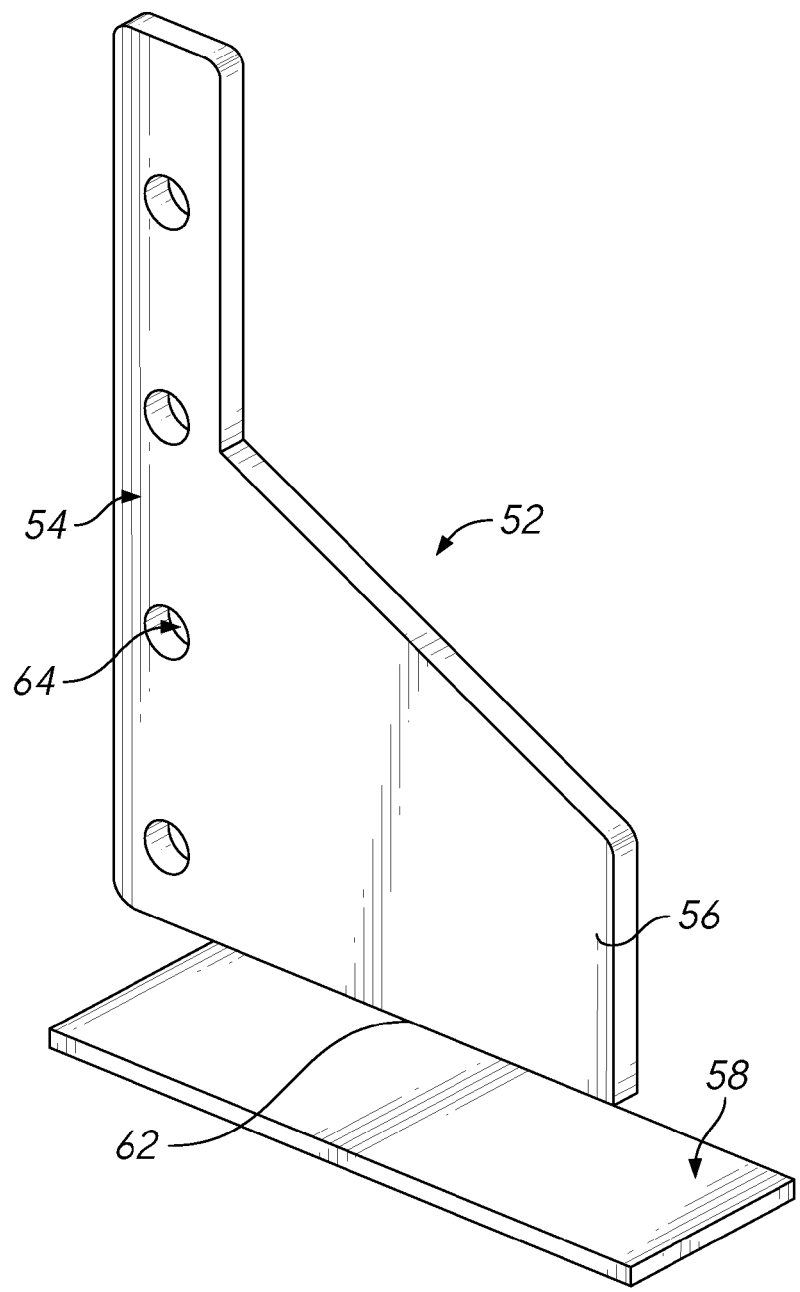
FIG. 6 is a perspective view of yet another bracket design configured to bolt onto an inside surface of an upright, rather than to the front surface of an upright.

FIG. 6 shows another bracket 52 similar to the bracket 48 but designed to bolt onto an inside surface of an upright rather than a front surface of an upright. The bracket 52 may also be formed directly from stock steel plate as described above relative to the bracket 50 shown in FIG. 4.

Figure 7:
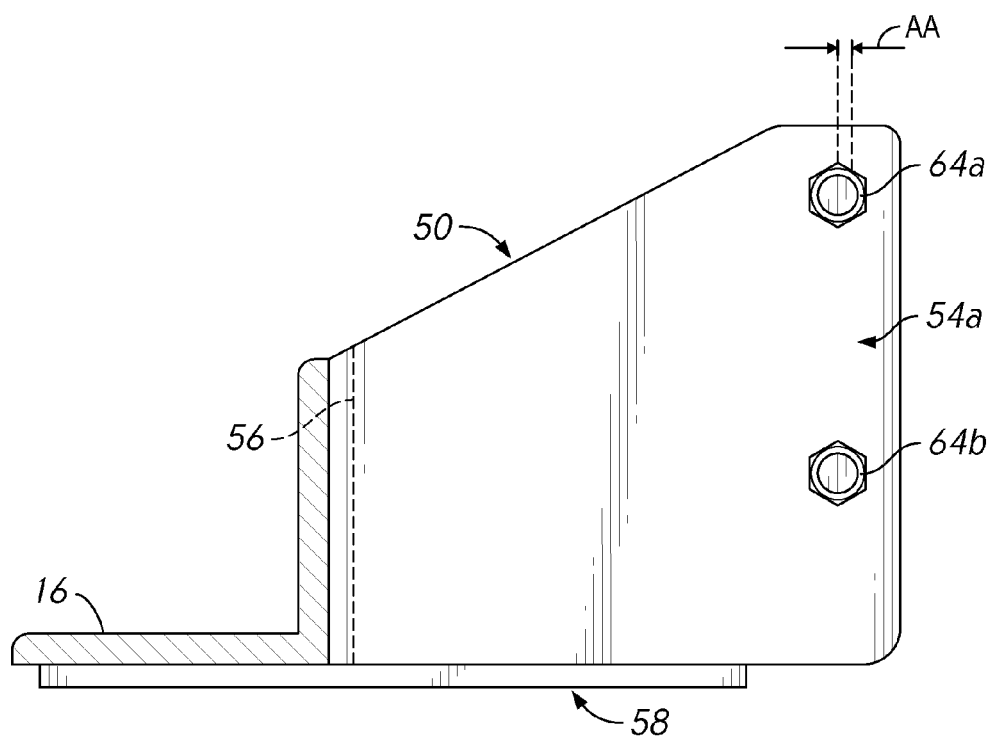
FIG. 7 is a front view of a modified bracket similar to the design shown in FIG. 4.

FIG. 7 shows a front view of the rail arm 50 as installed in FIG. 4, with the section 56 shown in dotted lines. The through holes 64 in the upright section 54 of the rail arm 50 may be arranged in an offset pattern. Specifically, the first or top hole 64A is slightly offset laterally from the second or bottom hole 64B. The amount of offset AA may range from about 0.015 to about 0.10 inches. The offset holes help to reduce sagging of the drive-in rail due to slight downward rotation of the rail 16 resulting from the necessary clearance between the bolts 36 extending through the holes 64.

Figure 8:
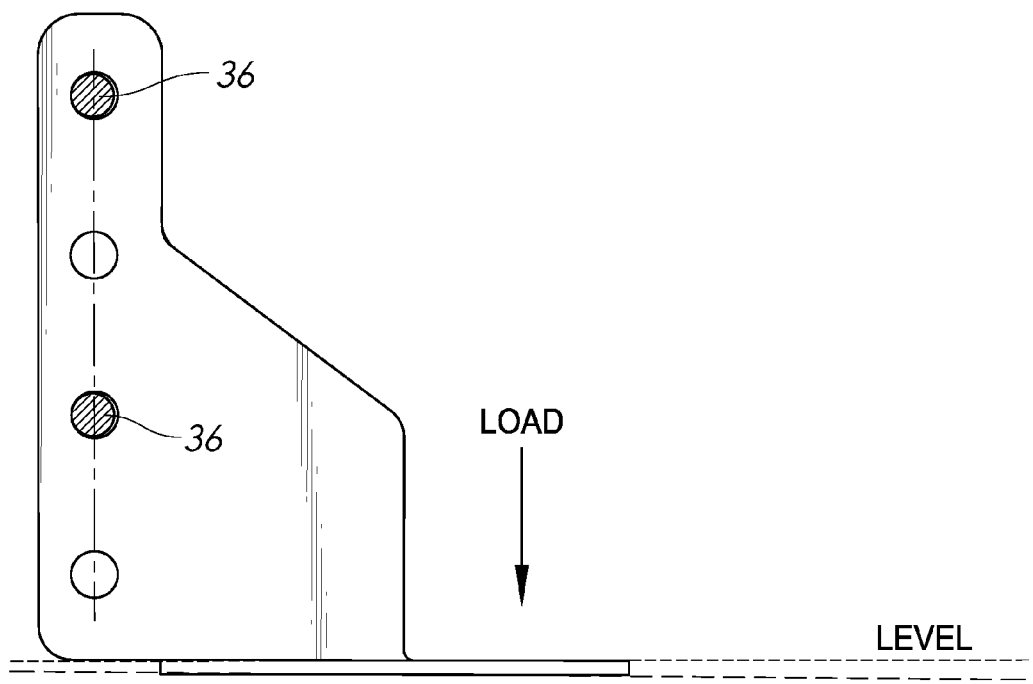
FIG. 8 is an enlarged view of a bracket showing bolt positions in aligned holes under loading, and illustrating sagging that can occur with aligned holes.
Figure 9:
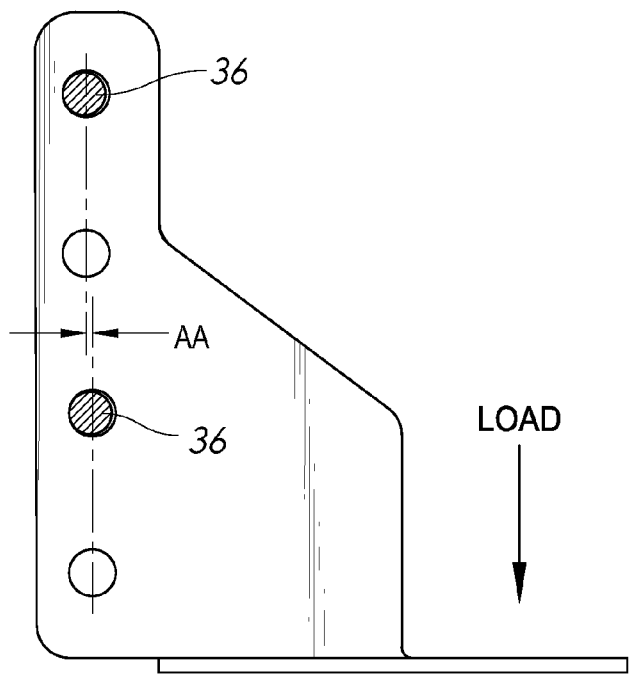
FIG. 9 is an enlarged view of a representative bracket showing bolt positions in the holes under load, and illustrating reduction or elimination of sagging using off-set holes.

The effect of the offset holes is further shown in FIGS. 8 and 9. The bracket in FIG. 8 has aligned holes as used in the prior art. As shown, under load the bracket tends to rotate slightly clockwise due to the clearance in the holes. All clearance around the upper bolt 36 is on the right side and all clearance around the lower bolt 36 is on the left side, as bracket rotates slightly clockwise, until the bolts come into firm contact with the sides of the holes to resist the torque applied by the load. Consequently the bracket may shift into an out of level position. FIG. 9 shows an aspect of the present improved bracket having offset holes. The holes are offset which tends to compensate for the clearance around the bolts. The upper hole is offset to the left side relative to the lower hole. As a result, the bracket holds the drive in rail level, even under loading.

Thus, a novel bracket for a drive-in storage rack has been shown and described. Various changes and substitutions may of course be made without departing from the spirit and scope of the invention. The invention, therefore, should not be limited, except by the following claims, and their equivalents.

The invention claimed is:

1. A drive-in storage rack, comprising:
   a left side upright and right side upright each having vertically aligned bolt clearance holes;
   a left side non-inverted L-shaped drive-in rail attached to the left side upright via a left side rail arm;
   a right side non-inverted L-shaped drive-in rail attached to the right side upright via a right side rail arm, with no member connecting the left and right side uprights, below the left and right side rail arms, to provide an open space between the right side drive-in rail and the left side drive-in rail large enough to allow a fork-lift truck to enter and place a pallet onto the drive-in rails;
   with the left and right side rail arms each having an upright section including a sidewall section and a rail section, and with the sidewall section substantially perpendicular to the rail section, and with the left and right side drive-in rails resting on top of the rail sections of the left and right side rail arms, respectively; and
   first and second pairs of circular through holes in the upright section of each side rail arm, with the first pair of circular holes offset from the second pair of circular holes, and bolts extending through the offset holes in each side rail arm and through the vertically aligned bolt clearance holes in the uprights, to reduce or avoid sagging of the drive-in rails.

2. The drive-in storage rack of claim 1 wherein in each side rail arm, the first pair of holes is offset from the second pair of holes by 0.015 to 0.10 inches.

3. The drive-in storage rack of claim 1 with the left side drive-in rail having a left vertical section joined to a left horizontal section, and the left vertical section spaced apart from the left side upright, and with the right side drive-in rail having a right vertical section joined to a right horizontal section, and the right vertical section spaced apart from the right side upright.

4. The drive-in storage rack of claim 1 with the upright section having an inclined top edge extending upwardly at an angle relative to the rail section.

5. The drive-in storage rack of claim 1 with each rail arm having a single rail section at a lower end of the sidewall section.

* * * * *